UNITED STATES PATENT OFFICE.

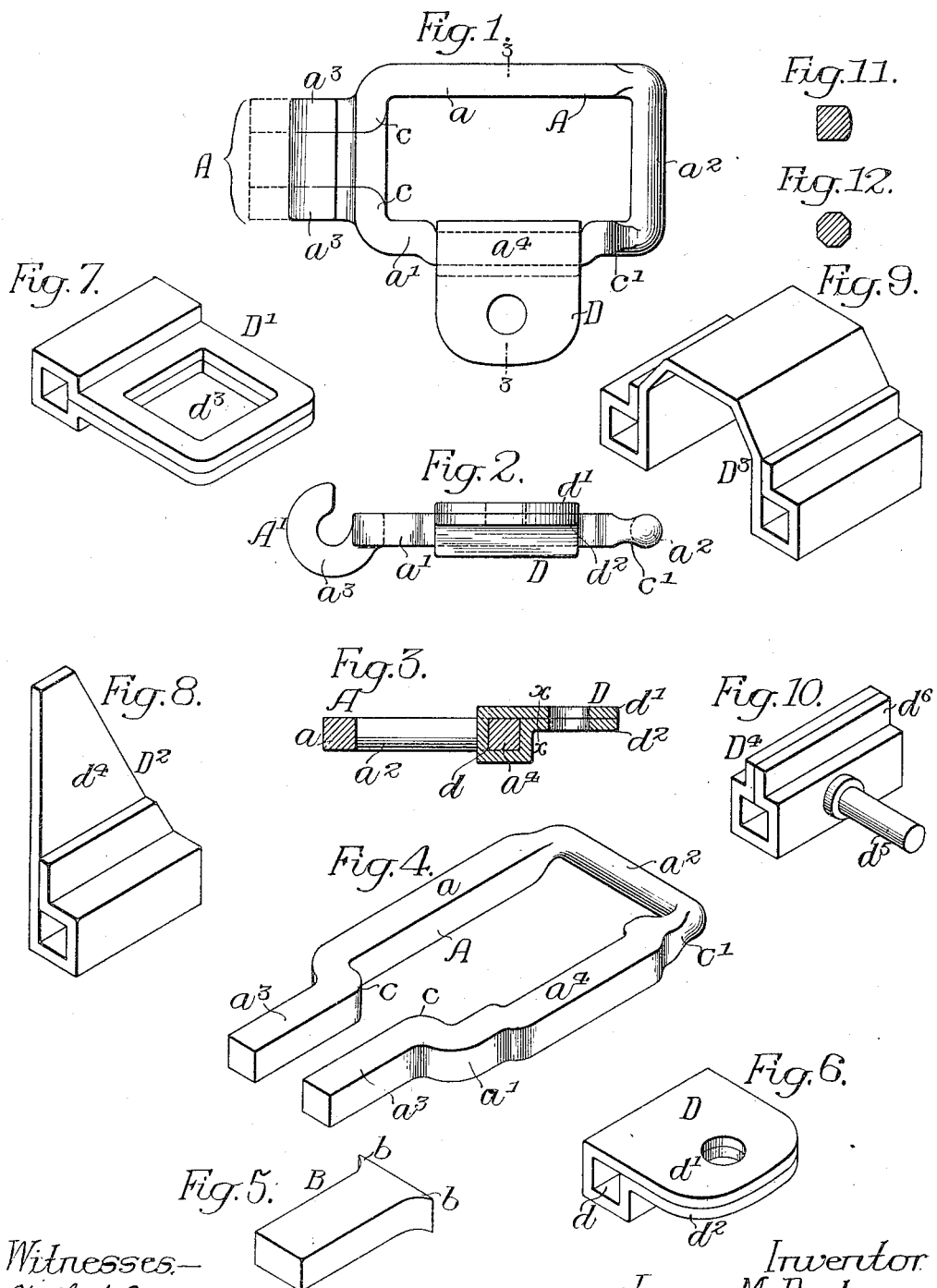

JAMES M. DODGE, OF PHILADELPHIA, PENNSYLVANIA, ASSIGNOR TO LINK-BELT COMPANY, OF CHICAGO, ILLINOIS, A CORPORATION OF ILLINOIS.

CHAIN-LINK.

1,069,536. Specification of Letters Patent. Patented Aug. 5, 1913.

Application filed January 20, 1909. Serial No. 473,270.

*To all whom it may concern:*

Be it known that I, JAMES M. DODGE, a citizen of the United States, residing in Philadelphia, Pennsylvania, have invented certain Improvements in Chain-Links, of which the following is a specification.

My invention relates to certain improvements in chain links of the type in which one link can be readily coupled to or detached from another.

One object of my invention is to make such a link of wrought metal bent into shape and welded.

A further object of the invention is to make the link from bars shaped other than circular in cross section; and a still further object is to so construct the link that attachments can be readily applied thereto.

These objects I attain in the following manner, reference being had to the accompanying drawing, in which:—

Figure 1, is a plan view of my improved chain link with an attachment secured thereto; Fig. 2, is a side view of Fig. 1; Fig. 3, is a transverse sectional view on the line 3—3, Fig. 1; Fig. 4, is a detached perspective view of the link partly bent; Fig. 5, is a perspective view of the filling block used at the hook end of the link; Fig. 6, is a detached perspective view of the attachment shown in Fig. 1; Figs. 7, 8, 9 and 10 are perspective views of other attachments which may be applied to the link; and Figs. 11 and 12 are cross sectional views of side bars of different cross section.

The link A is made from a steel bar quadrangular in cross section; in the present instance; the bar being bent to form side members $a$, $a'$, a cross bar $a^2$ and extensions $a^3$ which eventually form the hook of the link. The side members $a$, $a'$ are quadrangular in cross section but the cross bar $a^2$ is forged or pressed to a round in order to fit the hook of an adjoining link. The extensions $a^3$, $a^3$ are first bent as shown by dotted lines in Fig. 1 and a block B, preferably flared at $b$, $b$, is inserted between these extensions, as indicated, and welded thereto by any suitable welding process, preferably by the electric welding process. The flared portions $b$, $b$ are curved to fit the curved shoulders $c$, $c$ of the body portion A of the link. Preferably after the parts are welded the extensions $a^3$ and the block B are bent into hook form, as shown at A', Fig. 2; the cavity of the hook being of such a size as to fit the cross bar $a^2$ of an adjoining link. The opening into this cavity is preferably narrower than the cavity itself and one side member of each link is reduced at $c'$ so that one link can be readily coupled to another by simply sliding the cross bar $a^2$ of one link into the hook portion of an adjoining link, as in the common method of manufacturing detachable chain links of cast metal.

One of the particular advantages of making the link from bars quadrangular or of a form other than circular in cross section is that the attachments can be readily applied to the link and held in proper position in a very simple manner. By the term "attachment," I mean any structure capable of serving as a means for connecting to a link any other structure, such, for example, as a slat or bar belonging to a drier, or a flight or other structure forming part of or belonging to a conveyer or the like.

As shown in the drawing I offset the portion $a^4$ of the side member $a'$ of the link, still retaining its quadrangular shape. If an attachment, as shown at D, Fig. 6, is to be applied to the link, it is made by so bending a plate as to form a quadrangular opening $d$ to fit the side member $a^4$ of the link and the two projecting members $d'$, $d^2$ are drawn together after the attachment is in place and secured by electric welding, riveting, or by the use of bolts; if welded the weld is preferably made on the line $x$—$x$, Fig. 3. By this method the attachment is held rigidly in any desired position so that it can project beyond the link, as shown in Fig. 3. The attachment can be perforated in any manner desired.

Instead of the attachment shown in Fig. 6, the one shown at D', Fig. 7, having an enlarged opening $d^3$, may be used; or the attachment shown at $D^2$, Fig. 8, having a vertical extension $d^4$ may be mounted on a link; or the bridge attachment, as indicated at $D^3$, Fig. 9, may be used, in this case the attachment is secured to both members $a$, $a'$ of the link and both members are preferably offset so as to provide room for the movement of the teeth of the sprocket wheel, although this is not absolutely essential in this case. Fig. 10, shows another form of attachment $D^4$ having a pin $d^5$; the projecting members $d^6$ of the attachment being welded together in this instance. It will be understood that any form of attachment may be applied to the link without departing from the essential features of the invention, and that while I prefer to make the side members quadrangular in cross section, they may be made as shown in Figs. 11 and 12,—Fig. 11 showing the inner face of the side member curved, while Fig. 12 shows the member octagonal in cross-section. In this instance I have shown the link made from a square bar reduced to the round to form the cross bar, but it may be made from a round bar reduced to the square to form the side members if desired.

I claim:

1. The combination of a link having an offset side bar substantially polygonal in cross section, with an attachment encircling the bar and clamped thereto.

2. The combination of a link having an offset side bar, the offset portion being square in cross section; with an attachment made of a single piece of material fitting around the offset portion of the bar.

In testimony whereof, I have signed my name to this specification, in the presence of two subscribing witnesses.

JAMES M. DODGE.

Witnesses:
Jos. H. Klein,
Wm. A. Barr.